(12) United States Patent
Hauber

(10) Patent No.: US 9,114,834 B2
(45) Date of Patent: Aug. 25, 2015

(54) METHOD AND DEVICE FOR PARKING A MOTOR VEHICLE

(75) Inventor: Simon Hauber, Freiberg am Neckar (DE)

(73) Assignee: ROBERT BOSCH GMBH, Stuttgart (DE)

(*) Notice: Subject to any disclaimer, the term of this patent is extended or adjusted under 35 U.S.C. 154(b) by 546 days.

(21) Appl. No.: 13/004,717

(22) Filed: Jan. 11, 2011

(65) Prior Publication Data

US 2011/0199236 A1 Aug. 18, 2011

(30) Foreign Application Priority Data

Feb. 15, 2010 (DE) .......................... 10 2010 001 922

(51) Int. Cl.
*B60Q 1/48* (2006.01)
*B62D 15/02* (2006.01)

(52) U.S. Cl.
CPC ........ *B62D 15/027* (2013.01); *B60W 2550/142* (2013.01); *B60W 2710/207* (2013.01)

(58) Field of Classification Search
CPC .................... G05D 2201/0213; B62D 15/027; B60W 2550/142; B60W 2710/207
USPC .............................................. 340/932.2, 438
See application file for complete search history.

(56) References Cited

U.S. PATENT DOCUMENTS

| 3,673,561 | A | * | 6/1972 | Bronstein | 340/438 |
|---|---|---|---|---|---|
| 4,516,653 | A | * | 5/1985 | Walker | 180/199 |
| 5,586,031 | A | * | 12/1996 | Fussl | 701/41 |
| 2002/0110262 | A1 | * | 8/2002 | Iida et al. | 382/104 |
| 2003/0122687 | A1 | * | 7/2003 | Trajkovic et al. | 340/932.2 |
| 2004/0099044 | A1 | * | 5/2004 | Streit et al. | 73/1.38 |
| 2004/0124971 | A1 | * | 7/2004 | MacTavish et al. | 340/425.5 |
| 2005/0060069 | A1 | * | 3/2005 | Breed et al. | 701/29 |
| 2006/0097859 | A1 | * | 5/2006 | Nordbruch | 340/440 |
| 2006/0247094 | A1 | * | 11/2006 | Fowler et al. | 477/166 |
| 2007/0198145 | A1 | * | 8/2007 | Norris et al. | 701/23 |
| 2007/0252075 | A1 | * | 11/2007 | Heinemann et al. | 250/215 |
| 2008/0009990 | A1 | * | 1/2008 | Katoh et al. | 701/36 |
| 2008/0071457 | A1 | * | 3/2008 | Shiraki | 701/70 |
| 2008/0162027 | A1 | * | 7/2008 | Murphy et al. | 701/117 |
| 2009/0091093 | A1 | * | 4/2009 | Urababa et al. | 280/5.511 |
| 2009/0128364 | A1 | * | 5/2009 | Lee | 340/932.2 |
| 2009/0178876 | A1 | * | 7/2009 | Miki et al. | 180/411 |

(Continued)

FOREIGN PATENT DOCUMENTS

| DE | 10 2004 050 052 | 5/2006 |
|---|---|---|
| DE | 10 2007 061 234 | 6/2009 |

(Continued)

*Primary Examiner* — Naomi Small
(74) *Attorney, Agent, or Firm* — Kenyon & Kenyon LLP

(57) ABSTRACT

A method and corresponding device for turning at least one steerable wheel of a motor vehicle during parking on a longitudinal inclination of a roadway includes activating a parking brake of the motor vehicle, ascertaining the inclination angle of the vehicle inclination that is effected by the longitudinal inclination of a roadway, and turning the steerable wheel to achieve a wheel angle as a function of at least one specifiable and/or ascertained parameter. The setting of the magnitude of the wheel angle takes place as a function of at least one surroundings situation of the motor vehicle, ascertained using at least one sensor. The corresponding device cooperates with a parking brake, an inclination angle sensor, a steering device, and a surroundings recording device having at least one sensor.

9 Claims, 3 Drawing Sheets

(56) References Cited

U.S. PATENT DOCUMENTS

| | | | |
|---|---|---|---|
| 2009/0271114 A1* | 10/2009 | Herbert et al. | 701/301 |
| 2010/0023221 A1* | 1/2010 | Klein et al. | 701/42 |
| 2010/0294602 A1* | 11/2010 | Gustafsson et al. | 188/158 |
| 2011/0057813 A1* | 3/2011 | Toledo et al. | 340/932.2 |
| 2011/0074604 A1* | 3/2011 | Hsu et al. | 340/932.2 |

FOREIGN PATENT DOCUMENTS

| | | |
|---|---|---|
| EP | 1 327 553 | 7/2003 |
| EP | 1 361 458 | 11/2003 |
| EP | 2 113 436 | 11/2009 |

* cited by examiner

METHOD AND DEVICE FOR PARKING A MOTOR VEHICLE

FIELD OF THE INVENTION

The present invention relates to a method for turning at least one steerable wheel of a motor vehicle when parking on a longitudinal inclination of a roadway. The present invention also relates to a device directed towards this, especially for carrying out the method.

BACKGROUND INFORMATION

The parking of motor vehicles on longitudinally inclined roadways requires particular circumspection on the part of the driver, in order to secure the motor vehicle against unintended rolling away in the direction of the longitudinal inclination of the roadway.

A method for warning the driver, during the parking of the motor vehicle on a longitudinally inclined roadway, is described in German Patent No. DE 10 2004 050 052, which reminds the driver to secure his motor vehicle if he forgets, when parking the vehicle on a longitudinally inclined roadway, to set a wheel angle that will prevent the unintended rolling away of the motor vehicle. The method provided in that document steers the attention of the driver to the necessity of securing against rolling away, that is still to be undertaken. It is true that an active action of the driver is required for this, namely, indeed, undertaking the securing, particularly by setting the suitable wheel angle/steering angle. It is optionally provided to have the wheel angle corrected or set with the aid of the roadway inclination ascertained, for instance, by a parking assistant function, which acts upon the steering of the motor vehicle. In unfavorable cases, however, these measures are insufficient for effecting sufficient securing of the motor vehicle against unintended rolling away.

SUMMARY OF THE INVENTION

The method according to the present invention makes possible, in a far more inclusive manner, the secure parking of motor vehicles on a longitudinally inclined roadway, and in doing so, takes into account the different circumstances of the most varied surroundings conditions, in the most inclusive manner.

For this purpose, a method is provided for turning at least one steerable wheel of a motor vehicle during parking on a longitudinal inclination of a roadway, having the following steps:
  activating a parking brake of the motor vehicle,
  ascertaining an angle of inclination of a vehicle inclination that is effected by the longitudinal inclination of the roadway,
  turning the steerable wheel to achieve a wheel angle as a function of at least one specifiable and/or ascertained parameter.

It is provided that the setting of the magnitude of the wheel angle take place as a function of at least one surroundings situation of the motor vehicle, ascertained using at least one sensor, in this context. Accordingly, the motor vehicle is parked and the parking brake of the motor vehicle is activated. By parking brake one should understand, in this case, any form of braking device that; in the parked state, is intended to prevent the vehicle from rolling away, by the action of braking devices of the motor vehicle, such as brake disks or brake drums, that is, parking brakes or hand brakes. The activation of the parking brake, in this instance, may be performed by the driver or by an independent system that is completely configured by the driver, for example, a Key-off Apply or a Hill Hold Control. Thereupon the angle of inclination is ascertained, which the vehicle assumes (vehicle inclination), and which is effected by parking along the longitudinally inclined roadway (in the driving direction or the opposite direction). The magnitude of the angle of inclination enables making predictions with respect to the force acting on the motor vehicle that would favor the rolling away of the motor vehicle. There then follows the turning of the steerable wheel (of course, a plurality of steerable wheels could also be steered), and this taking place as a function of at least one specifiable and/or ascertained parameter. The manner in which the at least one steerable wheel is steered thus depends on at least one parameter. The wheel angle is not always the same, but it is ascertained as a function of the at least one parameter.

For this purpose, the surroundings situation of the motor vehicle is ascertained by at least one sensor. By surroundings situation one should understand, in this instance, the direct surroundings of the motor vehicle, in the widest meaning of the term. For example, one may ascertain whether there are obstacles, for instance, other motor vehicles, in front of, or behind the motor vehicle, particularly in the direction of the longitudinal inclination (downhill gradient). For, when the vehicle starts to roll, the avoidance of which is the purpose of the method, the turned steering angle is not only supposed to prevent the rolling away of the motor vehicle, but preferably also to prevent the motor vehicle from rolling into an obstacle, such as a motor vehicle parked ahead of it, and damaging it. The wheel angle is always selected, in this instance, in such a way that rolling away of the motor vehicle, especially onto the roadway, is avoided in the same way as an undesired rolling of the motor vehicle into obstacles which could lead to damage.

In one preferred method development, during the ascertainment of the surroundings situation, it is detected whether a curb is present. Curbs are very suitable for avoiding the rolling away of the motor vehicle, by selecting the wheel angle so that at least one steerable wheel of the motor vehicle strikes against the curb already during the parking of the motor vehicle, or else in that a vehicle starting to roll, whose parking brake is not sufficiently effective, is braked by the curb that the turned, steerable wheel is running into.

In one preferred method development, during the ascertainment of the surroundings situation, it is detected how high the curb is. The height of the curb above the roadway level permits a judgment of the question as to whether the curb, for instance, at a given wheel diameter of the motor vehicle, is able effectively to prevent its rolling away. In the case of very large wheel diameters, it is required that the curb have a certain minimum height, since the steerable wheel would otherwise roll beyond the curb, in response to sufficient energy of motion of the vehicle that is starting to roll, provided the curb is hit at a certain angle. The wheel angle that is necessary effectively to avoid the rolling away of the motor vehicle is accordingly set as a function also of the height of the curb and, for instance, the wheel diameter of the steerable wheel. The wheel diameter, in this instance, may be taken from a look-up table stored in a device of the motor vehicle. In order to take into account safety interests, it is preferred to assume the largest possible wheel diameter that is admissible for the vehicle, provided another wheel diameter, corresponding to the mounted wheel, is not specified in a dedicated manner.

In one additional preferred specific embodiment, it is detected, during the ascertaining of the surroundings situation, how far the vehicle is laterally distant from the curb. In the regular case, one assumes that the vehicle is parked essentially parallel to the roadway edge of the longitudinally inclined roadway. As a function of the lateral distance from the curb, the motor vehicle is able to cover a differently long path if it starts to roll based on the failure or insufficient holding force of the parking brake. The longer this path is, that the vehicle is able to cover before reaching the curb, the larger is the energy of motion attained, which, in the case of a given wheel diameter, is able to lead to riding over the curb at a certain wheel angle. For this reason, in determining the wheel angle while ascertaining the surroundings situation, the lateral distance of the vehicle from the curb is taken into account, and the wheel angle that is to be selected for the situation that is found, is adjusted.

In a further preferred specific embodiment, while ascertaining the surroundings situation, it is detected what the diameter is of the wheel of the vehicle facing the curb. As was described before, in that way one is able to ascertain in that manner the wheel angle at which most favorably the rolling over the curb can be avoided, which is used as the path limiter for the vehicle that may perhaps start to roll. The detection of the wheel diameter takes place, in this instance, with the aid of the actually mounted wheels, and not from values stored in a table, for example. This is made possible, for example, by clear communication means between the wheel and the motor vehicle, perhaps by contact-giving alignments, message transfer means, such as RFID chips mounted on the wheels and corresponding receivers on the motor vehicle, or other devices making possible unequivocal signaling. In this way it is ensured that the wheel angle, ascertained as being favorable, constantly takes into account the actually given, constructional specifications of the vehicle. In particular, when wheels are changed, for instance, from summer to winter wheels, which frequently have a lower diameter than summer wheels, the favorable wheel angle is thus ascertained newly and reliably, in an advantageous manner.

In one additional advantageous specific embodiment, it is detected, during the ascertaining of the surroundings situation, on which side of the vehicle the curb is located. A safer functioning of the method is thereby even ensured if the vehicle parks counter to the travel direction, and the curb expected by the system is thus found to be on the other than the usual side of the vehicle, for example, on the left in countries having right-hand traffic or right in countries having left-hand traffic. In a very advantageous manner, one may take into account the actual surroundings of the vehicle, and safer parking may be ensured even in uncommon parking situations.

In another particularly preferred method development, when no curb is detected during the ascertainment of the surroundings situation, the steerable wheel is turned into a wheel angle of specified magnitude and direction, which prevents the rolling of the vehicle onto the roadway. This angle is preferably an angle such that it effects a (possible) start of rolling of the vehicle to the roadway edge, that is, in such a way that the vehicle cannot roll into the roadway, or which prevents the starting to roll at the angle of inclination found, for example, by extreme transverse positioning. In this instance, the wheel angle preferably has such a magnitude that, for the starting to roll of the vehicle, considerable force would have to be afforded, that is, the longitudinal inclination of a roadway would have to be considerable. In the overwhelming majority of all parking and stopping situations of a motor vehicle, one is thus able to effect safe parking and sufficient assurance against rolling away.

Furthermore, a device is provided for turning at least one steerable wheel of a motor vehicle while parking on a longitudinal inclination of a roadway, which cooperates with a parking brake, an inclination angle sensor and a steering device of the motor vehicle. It has a surroundings recording device having at least one sensor for recording the immediate surroundings of the motor vehicle. The surroundings recording device is used, in this case, to control and evaluate the at least one sensor for recording conditions of the immediate surroundings of the motor vehicle, which are drawn upon for judging the risk of rolling away and the possibilities of preventing such an undesired rolling away. In this instance, it is particularly possible to use the surroundings recording device using sensors of the motor vehicle, and use such sensors as are present in the motor vehicle in any case, for instance, such as the ones of a proximity warning system, of a parking assistant of a parking warning system or the like. The surroundings recording device is particularly used in this case for carrying out the abovementioned method for turning the at least one steerable wheel during parking on a longitudinal inclination of the roadway.

DETAILED DESCRIPTION

Figure 1:
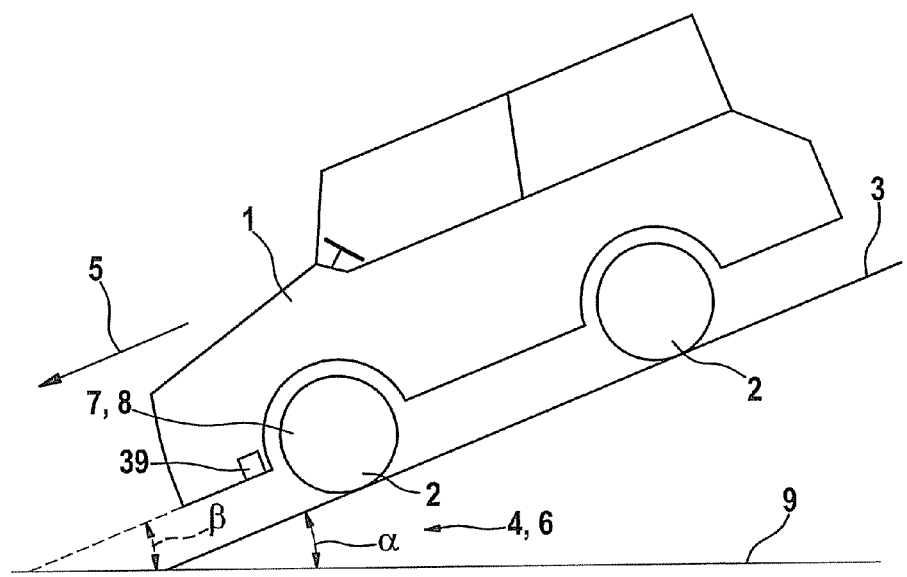
FIG. 1 shows a side view of a motor vehicle parked along a longitudinal inclination of a roadway.

FIG. 1 shows a motor vehicle 1, which is supported by wheels 2 on a roadway 3, and is parked, the roadway 3 having a longitudinal roadway inclination 4 by an angle of inclination α in travel direction 5 of motor vehicle 1. Accordingly, motor vehicle 1 is parking on a downhill gradient 6 in the situation shown. Of the wheels 2, front wheels 7, that is, wheels 2 mounted on a front axle of motor vehicle 1, are steerable wheels 8. It is assumed, in this instance, that motor vehicle 1 has at least essentially a vehicle inclination angle β, based on its chassis, that is not shown here in greater detail and the wheel suspensions not shown here in greater detail and the front and rear axles not shown here, and that this angle β is at least essentially identical to angle of inclination α of longitudinal roadway inclination 4 to the horizontal 9, angle of inclination α and vehicle inclination angle β being angles of the same size. The inclination angle of the vehicle is recorded using an inclination sensor 39 situated in motor vehicle 1.

Figure 2:
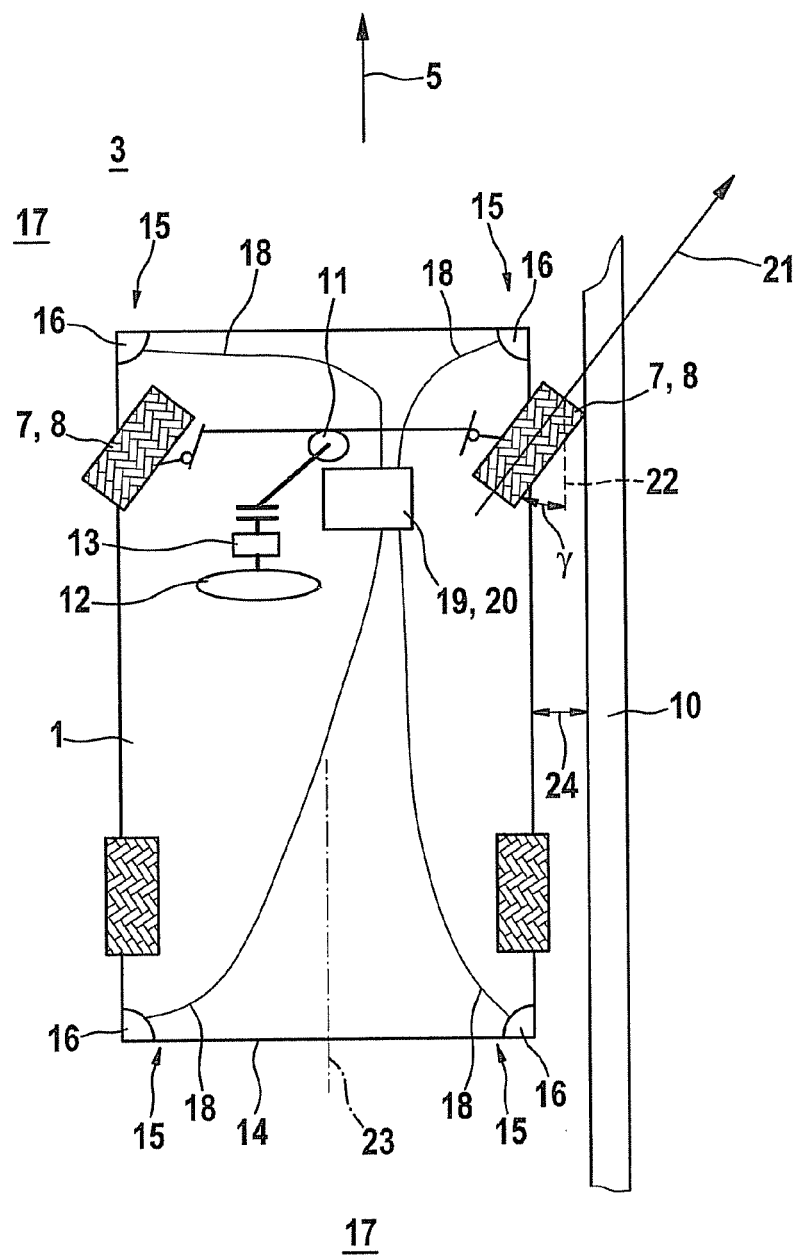
FIG. 2 shows the same motor vehicle in a schematic, sectional top view.

FIG. 2 shows the same motor vehicle 1 in an only schematic sectional representation, in a top view, motor vehicle 1 parking on roadway 3 shown in FIG. 1, and roadway 3 having a curb 10 on the right, and essentially parallel to motor vehicle 1, which is elevated above the level of roadway 3. To turn steerable wheels 8 (namely front wheels 7), motor vehicle 1 has a steering device 11, which is able to be operated by a driver (not shown) via a steering wheel 12, as well as by a steering assistance system 13. Steering assistance system 13 supports a parking assistant not shown here, for instance, and/or a lane keeping assistant. It is important that steering assistance system 13 have a direct operation of steering device 11, independent of the action of the unshown driver, and is thus able to effect the turning in of steerable wheels 8, that is independent of a positive activity of the unshown driver. Motor vehicle 1 has at its disposal a body 14, at whose outer corners 15 sensors 16 are situated, which record surroundings 17 of motor vehicle 1, for example, via radar waves or ultrasonic waves, and transmit the data thus obtained via suitable data connections 18, for instance, via electric lines or a data bus, to a surroundings evaluation device 19. Together with the at least one sensor 16, surroundings evaluation device 19 forms a surroundings recording device 20. Surroundings recording device 20 acts together with steering assistance system 13 to set a steering angle γ, steering angle γ coming about between straight-line roll-away direction 21 of the at least one steerable wheel 8 and a parallel 22 to travel direction 5 (which corresponds to a vehicle longitudinal axis 23 when the motor vehicle is parked).

In order to park motor vehicle 1 on longitudinally inclined roadway 3, steering angle γ, of the at least one steerable wheel 8, is set in such a way that rolling away of motor vehicle 1 onto roadway 3, or onto detected obstacles, does not take place if a parking brake (not shown here) does not apply sufficient holding force against the gravity-conditioned rolling inclination of motor vehicle 1 along longitudinal roadway inclination 4. In the example shown, steering angle γ is set in such a way that curb 10, detected by surroundings recording device 20, would be hit by (right) front wheel 7 if motor vehicle 1 started to roll, and motor vehicle 1, when starting to roll, would be braked in this way in its slantwise forward motion directed towards curb 10. The setting of steering angle γ takes place without the action of the unshown driver, just based on the data obtained by surroundings recording device 20 using sensors 16 and surroundings evaluation device 19. In this connection, particularly the presence of curb 10, or the lack of it, are taken into account, as well as the wheel diameter of the at least one steerable wheel 8, which is used for running onto possibly present curb 10. A respectively different steering angle γ may be required as a function of the wheel diameter and of the height of curb 10, in order to prevent motor vehicle 1 as advantageously as possible from rolling away, or even from starting to roll. Furthermore, it is taken into account whether there is a distance 24 between motor vehicle 1 and curb 10 or, in the case where there is no curb 10, a distance from a roadway edge or another suitable obstacle. This distance 24 is also relevant, with respect to the first-time hitting of the at least one steerable wheel 8, that is used for preventing rolling away towards a suitable obstacle, that would stop the motion of rolling away.

Moreover, it is provided that a measuring device (not shown) ascertain the increase in the force that is required for setting steering angle γ to the desired position. For, if steerable wheel 8 hits the curb, for instance, before steering angle γ is set, the force required for the further movement of steerable wheel 8 increases very greatly in a short period. This increase in force may be used as an indication that steerable wheel 8 is taking up such a position at curb 10, in an impacting manner, that curb 10 acts as a wedge, and consequently, the rolling away of motor vehicle 1 is prevented. The (additional) adjustment of steering angle γ is then interrupted. Damage to steerable wheel 8 may also advantageously be avoided thereby. The determination of the force required for setting steering angle γ on steerable wheel 8 may take place indirectly, for example, by measuring a current, the current consumption required by steering assistance system 13 for moving steering device 11 being measured from the voltage supply system of motor vehicle 1. A sudden increase in the required current strength leads to the conclusion that there is a blockage in the motion of steering device 11 by steering assistance system 13, and, with that, that steerable wheel 8 is hitting curb 10.

Figure 3:
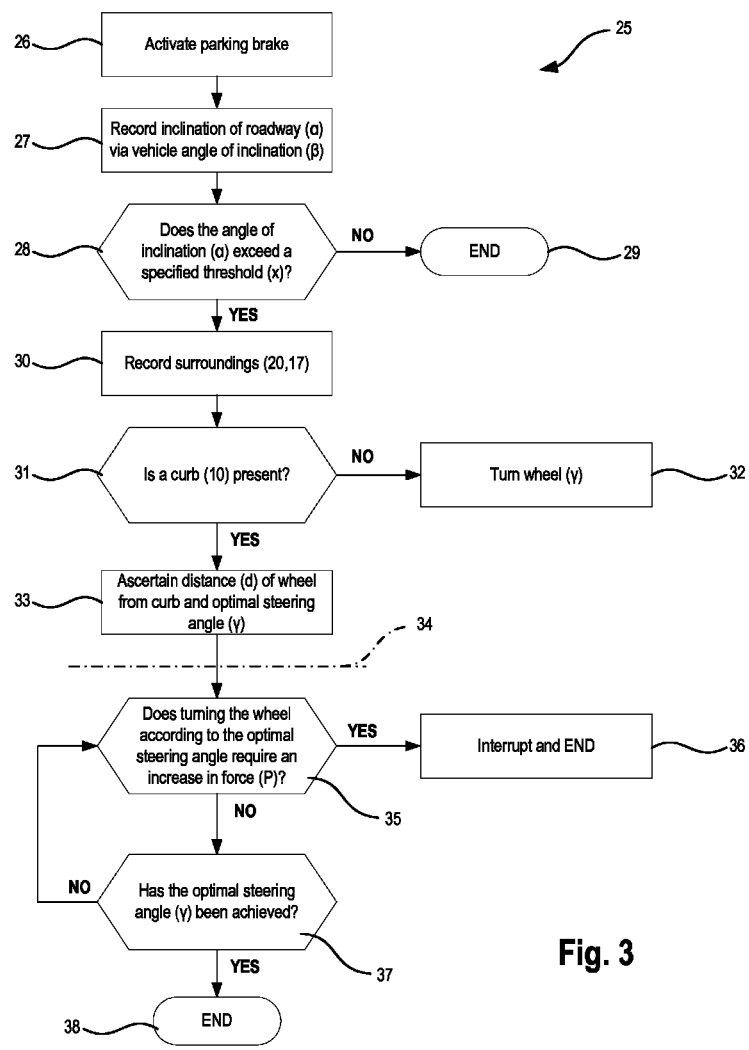
FIG. 3 shows an exemplary method flow chart.

FIG. 3 shows a method flow chart 25 for turning the at least one steerable wheel 8 of motor vehicle 1 described in FIGS. 1 and 2. To the extent that reference numerals are not given by FIG. 3 itself, one should consult FIGS. 1 and 2 in addition.

The method begins at step 26, namely, the activation of the parking brake of motor vehicle 1. In following step 27, longitudinal inclination 4 of the roadway is recorded via vehicle angle of inclination β and equated to angle of inclination α of roadway 3 (as described above, based on the constructional conditions of motor vehicle 1 it is assumed that, in the case of a vehicle angle of inclination β, recorded by an inclination angle sensor that is mounted in motor vehicle 1, there exists at least essentially an equality to angle of inclination α of roadway 3). In next step 28 it is checked whether angle of inclination α exceeds a specified or a specifiable threshold value x, that is, whether there is a certain minimum slope of roadway 3. Threshold value x, in this instance, takes into account particularly the weight of motor vehicle 1, as well as constructively specified frictional resistances or mechanical losses, which counteract the motion of motor vehicle 1 in the mechanics of the vehicle. If this is not the case (in the present flow chart of FIG. 3, negated conditions are always characterized by n and affirmed conditions always by y), then in a step 29 the method is ended, since an especial securing of motor vehicle 1 from rolling away is not necessary. If the checking for the exceeding by angle of inclination α of a threshold value x is affirmed, then in a step 30, following step 28, surroundings 17 of motor vehicle 1 are recorded using surroundings recording device 20, and particularly via sensors 16, that are mounted on motor vehicle 1. In subsequent checking step 31, it is checked whether a curb 10 is present and, if necessary, its distance d from motor vehicle 1. If no curb is detected, that is, the checking question in step 31 as to the presence of curb 10 is negated, in step 32 the turning of the at least one steerable wheel 8 slantwise to the roadway direction (essentially slantwise to vehicle longitudinal axis 23) is effected, that is, a steering angle γ is set at a sufficiently slanting direction to vehicle longitudinal axis 23. If checking step 31 is affirmed, then in following step 33; the distance, is ascertained of the at least one steerable wheel 8, which is closest to curb 10, and from the wheel diameter of this wheel 8, the height of curb 10 and distance d of curb 10 from steerable wheel 8, optimal steering angle γ is ascertained. The wheel diameter is relevant for the determination of the question as to how easily a curb of a given height is able to be overcome by a vehicle starting to roll, and how steering angle γ is to be set to avoid the rolling over of that curb 10 that is actually found. Distance d of the at least one steerable wheel 8 from curb 10 is relevant for the determination of the question as to how much energy of motion motor vehicle 1 is able to assume when starting to roll at given angle of inclination α, until motor vehicle 1 is stopped by contact of the at least one steerable wheel 8 with curb 10. If the kinetic energy of motor vehicle 1 is high, based on a large angle of inclination α and a relatively large distance d from curb 10, it is possible, in response to an unfavorable steering angle γ, that curb 10 is overcome in an undesired manner, and is rolled over by steerable wheel 8. Accordingly, steering angle γ should be set in such a way that only as short as possible a rolling path is possible, that is, highly slantwise to travel direction 5 or vehicle longitudinal axis 23. Equally relevant is the determination of distance d between steerable wheel 8 and curb 10 for the ascertainment of steering angle γ that is possible at a given wheel diameter (for if motor vehicle 1 is standing very close to curb 10, a large steering angle γ, that is, a highly slantwise setting of steerable wheel 8 with respect to vehicle longitudinal axis 23, is not possible, because steerable wheel 8, at its outer circumference, is already running up against or hitting an edge of curb 10).

According to flow chart separating line 34, shown here in dash-dotted fashion, which, after a step 33 making possible an end of method 33, permits an optional continuation of the method, in a decision step 35 checking is provided by steering device 11, especially steering assistance system 13, for a force increase, that is, an increase of the force to be afforded so as to set steerable wheel 8 further in the direction of calculated steering angle γ. If such a force increase is detected, it is assumed that steerable wheel 8 has touched an edge of curb 10, so that the starting to roll of motor vehicle 1 is no longer possible, because curb 10 acts, so to speak, as a wedge under steerable wheel 8. If the calculated steering angle γ has not yet been reached at the time of the determination of the increase of the force P to be applied, the setting of steering angle γ is interrupted, and the value present at this time is maintained. The method is then ended in step 36. If no increase is determined during the setting of steering angle γ in checking step 35, in the following checking step 37 it is checked whether the calculated steering angle γ has been achieved. If calculated steering angle γ is not yet at hand, the setting of steerable wheel 8 is continued or repeated in a loop branching back after step 35, checking for a force increase, until calculated steering angle γ has been achieved and steerable wheel 8 has the wheel angle that was calculated and is required. If the achieving of steering angle γ is recognized, the method is ended in a final step 38.

What is claimed is:

1. A method for turning at least one steerable wheel of a motor vehicle during parking on a longitudinal inclination of a roadway, comprising:
    activating a parking brake of the motor vehicle;
    ascertaining an inclination angle of a vehicle inclination that is effected by the longitudinal inclination of a roadway;
    ascertaining, using at least one sensor, at least one surroundings situation of the motor vehicle in a parking space, including whether objects other than a curb are present; and
    turning the steerable wheel to achieve a wheel angle of the vehicle in the parking space as a function of at least one parameter, the parameter being at least one of specified and ascertained, wherein a setting of a magnitude of the wheel angle takes place as a function of the at least one surroundings situation of the motor vehicle.

2. The method according to claim 1, further comprising detecting whether a curb is present during the ascertaining of the surroundings situation.

3. The method according to claim 2, wherein when no curb is detected during the ascertainment of the surroundings situation, the steerable wheel is turned to a wheel angle of specified magnitude and direction, which prevents a rolling of the vehicle onto the roadway.

4. A method for turning at least one steerable wheel of a motor vehicle during parking on a longitudinal inclination of a roadway comprising:
    activating a parking brake of the motor vehicle;
    ascertaining an inclination angle of a vehicle inclination that is effected by the longitudinal inclination of a roadway;
    ascertaining, using at least one sensor, a surroundings situation of the motor vehicle; and
    turning the steerable wheel to achieve a wheel angle as a function of at least one parameter, the parameter being at least one of specified and ascertained;
    wherein:
        a setting of a magnitude of the wheel angle takes place as a function of the surroundings situation of the motor vehicle not including the longitudinal inclination of the roadway; and
        the ascertaining of the surroundings situation includes:
            detecting whether a curb is present; and
            detecting how high the curb is, the detected height being used to set the wheel angle in a parking space.

5. A method for turning at least one steerable wheel of a motor vehicle during parking on a longitudinal inclination of a roadway comprising:
    activating a parking brake of the motor vehicle;
    ascertaining an inclination angle of a vehicle inclination that is effected by the longitudinal inclination of a roadway;
    ascertaining, using at least one sensor, a surroundings situation of the motor vehicle; and
    turning the steerable wheel to achieve a wheel angle as a function of at least one parameter, the parameter being at least one of specified and ascertained;
    wherein:
        a setting of a magnitude of the wheel angle takes place as a function of the surroundings situation of the motor vehicle not including the longitudinal inclination of the roadway; and
        the ascertaining of the surroundings situation includes:
            detecting whether a curb is present; and
            detecting how far the vehicle is standing laterally distant from the curb.

6. A method for turning at least one steerable wheel of a motor vehicle during parking on a longitudinal inclination of a roadway, comprising:
    activating a parking brake of the motor vehicle;
    ascertaining an inclination angle of a vehicle inclination that is effected by the longitudinal inclination of a roadway;
    ascertaining, using at least one sensor, a surroundings situation of the motor vehicle; and
    turning the steerable wheel to achieve a wheel angle as a function of at least one parameter, the parameter being at least one of specified and ascertained;
    wherein:
        a setting of a magnitude of the wheel angle takes place as a function of the surroundings situation of the motor vehicle not including the longitudinal inclination of the roadway;
        the ascertaining of the surroundings situation includes:
            detecting whether a curb is present; and
            detecting a diameter of a wheel of the vehicle, which wheel faces the curb; and
        the turning the steerable wheel is based on the detected diameter and that the detected diameter is of the wheel facing the curb.

7. A method for turning at least one steerable wheel of a motor vehicle during parking on a longitudinal inclination of a roadway, comprising:
    activating a parking brake of the motor vehicle;
    ascertaining an inclination angle of a vehicle inclination that is effected by the longitudinal inclination of a roadway;
    ascertaining, using at least one sensor, a surroundings situation of the motor vehicle; and
    turning the steerable wheel to achieve a wheel angle as a function of at least one parameter, the parameter being at least one of specified and ascertained;
    wherein:
        a setting of a magnitude of the wheel angle takes place as a function of the surroundings situation of the motor vehicle not including the longitudinal inclination of the roadway; and the ascertaining of the surroundings situation includes:
    detecting whether a curb is present; and
    detecting on which side of the vehicle the curb is located, the detected side being used to set the wheel angle in a parking space.

8. A device for turning at least one steerable wheel of a motor vehicle during parking on a longitudinal roadway inclination, which cooperates with a parking brake, an inclination angle sensor and a steering device of the motor vehicle, the device comprising:
  a surroundings recording device having at least one sensor for recording the immediate surroundings of the motor vehicle in a parking space, including objects other than a curb,
  wherein a setting of a magnitude of a wheel angle of the vehicle while in the parking space takes place as a function of the immediate surroundings of the motor vehicle recorded by the surroundings recording device, such that the set magnitude of the wheel angle is different from a preceding magnitude of the wheel angle.

9. The method of claim 5, wherein the detection of how far the vehicle is standing laterally from the curb is used for setting the wheel angle in a parking space.

* * * * *